US006360802B1

United States Patent
Baldoni et al.

(10) Patent No.: US 6,360,802 B1
(45) Date of Patent: Mar. 26, 2002

(54) UNISTAGE TIRE BUILDING DRUM

(75) Inventors: Viscardo Baldoni; Domenico Milano; Massimo Petrillo; Mauro Grelli, all of Roma (IT)

(73) Assignee: Bridgestone Corp., Tokyo (JP)

( * ) Notice: Subject to any disclaimer, the term of this patent is extended or adjusted under 35 U.S.C. 154(b) by 0 days.

(21) Appl. No.: 09/471,742

(22) Filed: Dec. 23, 1999

(51) Int. Cl.⁷ .............................................. B29D 30/24
(52) U.S. Cl. ....................... 156/415; 156/417; 156/420
(58) Field of Search ........................... 156/414, 415, 156/417–420, 416, 398–403

(56) References Cited

U.S. PATENT DOCUMENTS

| 3,433,695 A | 3/1969 | Caretta et al. ............... 156/401 |
| 3,598,673 A | 8/1971 | Caretta ....................... 156/132 |
| 3,816,218 A * | 6/1974 | Felten ......................... 156/398 |
| 4,239,579 A | 12/1980 | Felten et al. ................ 156/398 |
| 5,099,892 A | 3/1992 | Siegenthaler ................ 140/88 |
| 5,099,893 A | 3/1992 | Giorgetti ..................... 140/88 |
| 5,225,028 A * | 7/1993 | Bierens ....................... 156/401 |
| 5,268,057 A | 12/1993 | Nojiri et al. ................. 156/415 |
| 5,288,352 A * | 2/1994 | Miyanaga et al. ........... 156/417 |
| 5,308,432 A | 5/1994 | Siegenthaler ............... 156/117 |
| 5,320,695 A | 6/1994 | Siegenthaler ............... 156/127 |
| 5,384,084 A | 1/1995 | Siegenthaler ............... 264/237 |
| 5,460,685 A | 10/1995 | Siegenthaler ............... 156/420 |
| 5,547,538 A | 8/1996 | Siegenthaler ............... 156/415 |
| 5,755,922 A | 5/1998 | Baldoni et al. ............. 156/415 |
| 5,798,018 A | 8/1998 | Siegenthaler ............... 156/397 |
| 6,039,825 A | 3/2000 | Siegenthaler ............... 156/111 |

FOREIGN PATENT DOCUMENTS

| EP | 0 278 892 | 8/1988 |
| EP | 0 459 728 | 12/1991 |

* cited by examiner

Primary Examiner—Geoffrey L. Knable
(74) Attorney, Agent, or Firm—Thomas R. Kingsbury; Michael Sand; John H. Hornickel

(57) ABSTRACT

A unistage drum (1) for building tires (2), the drum (1) having two half-drums (13), each of which has a ring of sectors (43a) movable by a first actuator (37, 46) to and from an expanded position to clamp a respective bead (7); each sector (43a) being defined by a first and a second block (49, 50) defined externally by respective cylindrical surfaces (55a, 55) and having respective mutually-contacting inclined surfaces (52, 53); and the second block (50) sliding on the first (49), by virtue of a second actuator (33, 37), to and from an outer position in which the second block (50) defines a relative portion of an annular shoulder (56) located, in use, between the two beads (7) and in a position adjacent to one of the beads (7).

6 Claims, 3 Drawing Sheets

UNISTAGE TIRE BUILDING DRUM

The present invention relates to a unistage tire building drum.

Tires comprising a two-bead carcass are normally produced on a drum comprising a cylindrical central body, and two half-drums located on opposites sides of the central body and moved in opposite directions along a common axis by a central actuating screw. Each half-drum normally comprises a ring of sectors, which, by means of a normally pneumatic actuator, are moved substantially radially with respect to the drum axis to and from an expanded position to clamp a respective bead in a given axial position along the respective half-drum. Each half-drum also comprises at least one bladder, which lies flat on the half-drum, on the outside of the bead clamping portion, and is inflatable to turn a lateral portion of a body ply up about the respective bead.

Experience has shown that, to effectively compact the material at the bead portions of the carcass being formed, each of the lateral portions of the body ply must be turned up onto an axial shoulder located on the drum just axially inwards of the portion supporting the relative bead.

Patent EP 0 459 728 relates to a unistage drum substantially of the above type, and which, in place of the cylindrical central body, features a ring of sectors located at the free ends of respective arms hinged to each half-drum and which, at rest, are located between the two half-drums and substantially parallel to the drum axis. When the central screw of the drum is activated, i.e. during formation of the carcass, the arms are rotated outwards so that the respective sectors define, on each half-drum, a ring or annular shoulder onto which the relative lateral portion of the body ply is turned up.

The above known drum has several drawbacks owing to the way in which the annular shoulders are defined. To begin with, the arms are so structured and operated that turn-up and formation of the carcass are performed substantially simultaneously, so that any additional strip of material must be applied and stitched to the already-formed carcass, and therefore with considerable difficulty. Secondly, the turn-up operation is performed against shoulders defined by hinged arms, which are intrinsically incapable of withstanding relatively severe axial pressure on the free ends. In other words, on a d rum of the type described in the above patent, using relatively high-pressure bladders and, hence, effectively compacting the bead portions of the carcass are practically impossible.

Moreover, substituting movable arms for the cylindrical central body, as on the drum described in the above patent, poses serious problems when first feeding the body plies onto the drum.

It is an object of the present invention to provide a unistage drum designed to eliminate the aforementioned drawbacks.

According to the present invention, there is provided a unistage drum for building tires comprising a carcass having two beads; the drum comprising a cylindrical central body, and two half-drums located on opposite sides of the central body and moved in opposite directions along a common axis by central actuating means; each half-drum comprising a ring of sectors, and first actuating means for moving said sectors in a substantially radial direction with respect to said axis and to and from an expanded position to clamp a respective bead in a relative given axial position along the relative half-drum; and the drum being characterized in that each said sector comprises a first and a second block, of which said first block cooperates with a relative said bead in said expanded position, and said second block comprises a cylindrical outer surface; and second actuating means for moving each said second block, with respect to the relative first block, to and from an outer position in which each second block projects radially outwards with respect to the relative first block to define a relative portion of an annular shoulder located between the given said axial position and the relative said outer surface, and in a position adjacent to the relative given said axial position.

A non-limiting embodiment of the invention will be described by way of example with reference to the accompanying drawings, in which.

Figure 1:
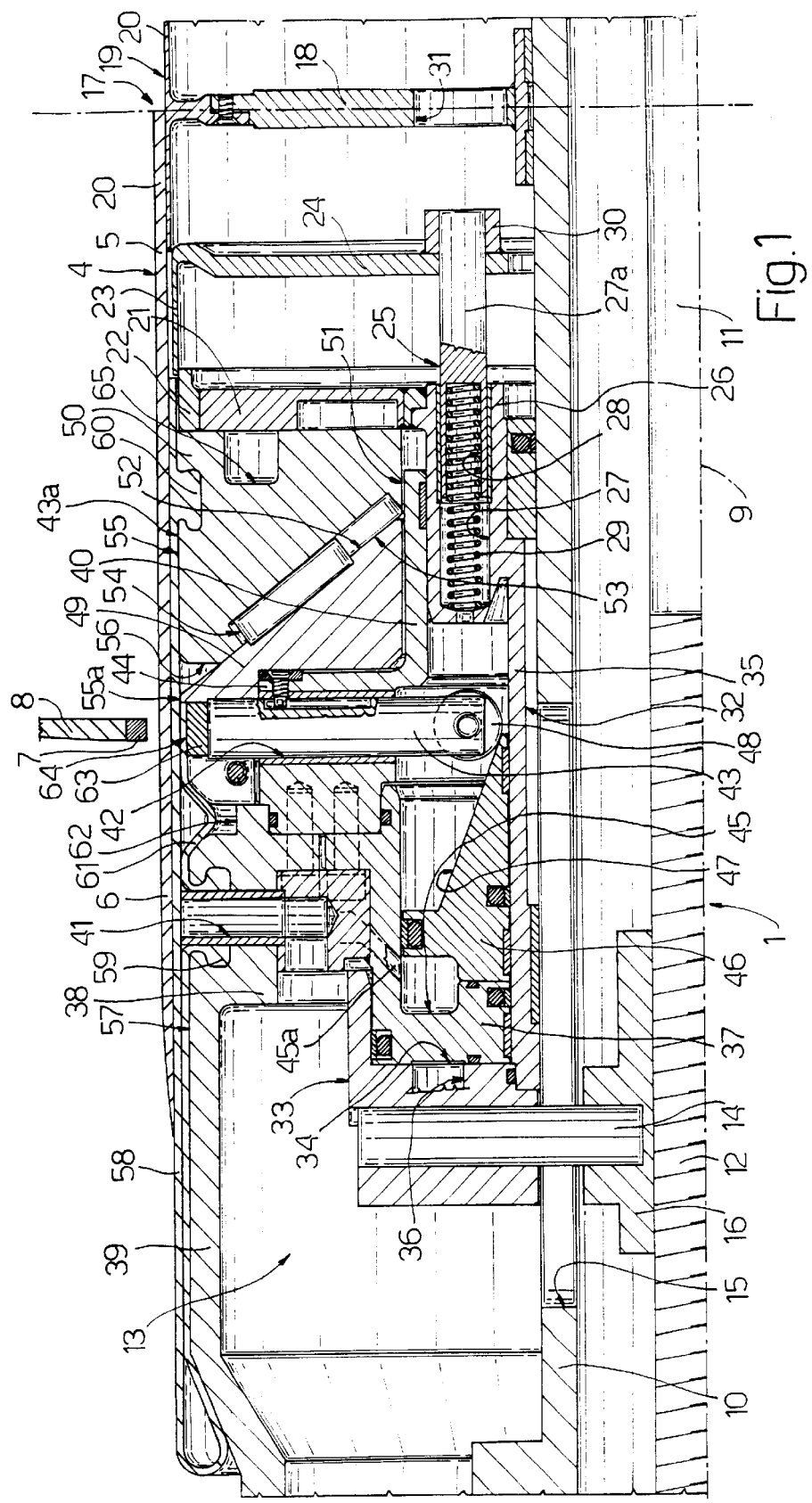
FIG. 1 shows an axial section of a detail of a preferred embodiment of the unistage drum according to the present invention.
Figure 5:
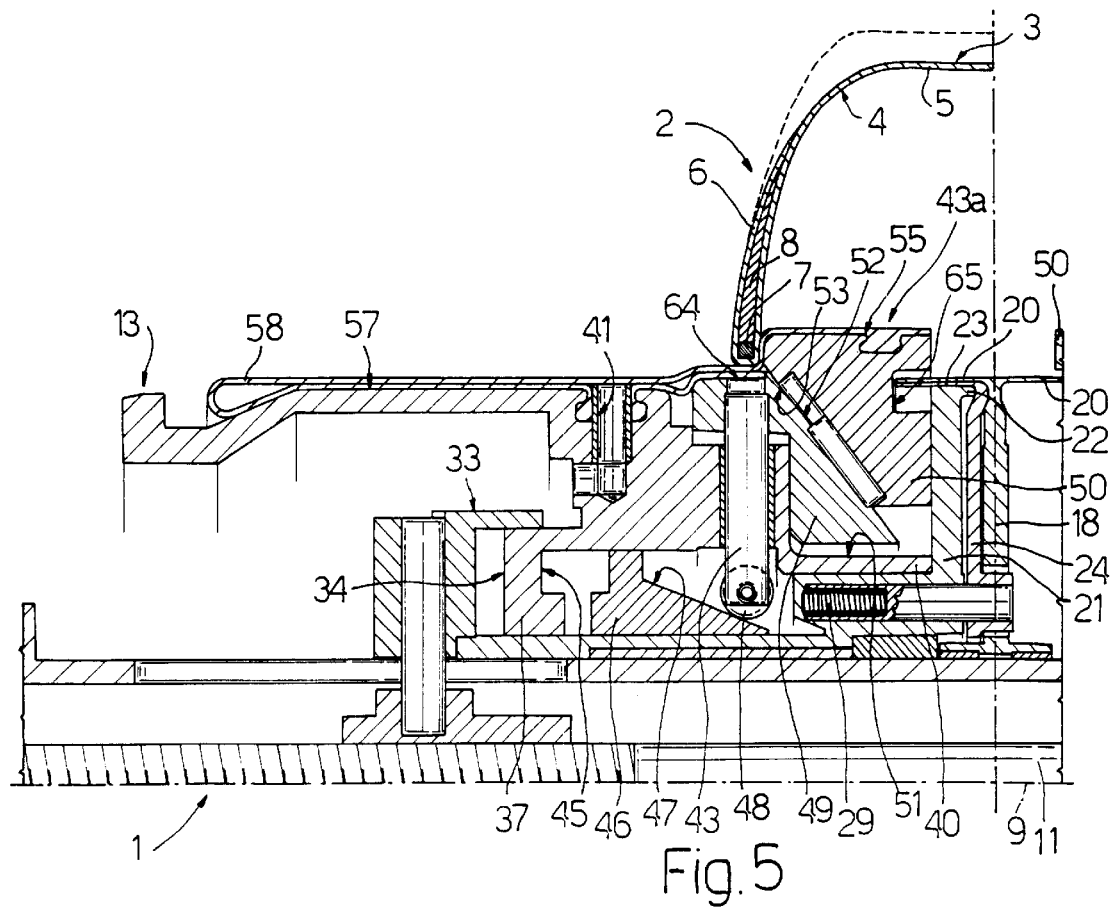

Number 1 in FIG. 1 indicates as a whole a drum for building a tire 2, which, as shown in FIG. 5, comprises a carcass 3 in turn comprising a body ply 4 defined by a toroidal central portion 5 and by two lateral portions 6 (only one shown) turned about respective metal beads 7 (only one shown), each of which is surrounded by an annular, substantially triangular-section filler 8.

Drum 1 is mounted for rotation about a respective axis 9, and comprises a tubular central shaft 10 coaxial with axis 9, and a powered central screw 11 mounted for rotation, coaxially with axis 9, inside shaft 10 and having, at opposite ends, two opposite threads 12 (only one shown).

Drum 1 also comprises two cylindrical half-drums 13 (only one shown), which are fitted in sliding manner to shaft 10, coaxially with each other and with axis 9, and each comprise a respective radial pin 14, which engages in sliding manner a respective longitudinal slot 15 formed through shaft 10, and is fitted on one end with a nut screw 16 connected to a respective thread 12 so that, for each turn of screw 11 about axis 9, the two half-drums 13 move axially, without rotating, in opposite directions along shaft 10.

Drum 1 also comprises a substantially cylindrical telescopic central body 17 coaxial with and connecting half-drums 13. More specifically, body 17 comprises an annular flange 13 fitted to shaft 10, at an intermediate point along shaft 10; and a central tubular element 19 fitted about flange 18 and having two tubular segments 20 extending symmetrically from and on opposite sides of flange 18.

Body 17 also comprises two end disks 21 (only one shown), each of which is coaxial with shaft 10, is integral with respective half-drum 13, and is fitted on the outer periphery with a tubular end body or segment 22 extending towards element 19.

Body 17 also comprises two intermediate tubular segments 23 (only one shown), each of which is movable with respect to both central tubular element 19 and relative end disk 21, and extends towards relative disk 21 from the outer periphery of a respective disk 24 fitted in sliding manner to and coaxial with shaft 10. Each tubular segment 23 has an inside diameter of a length approximately equal to but no less than the length of the outside diameter of relative tubular end segment 22; and an outside diameter of a length approximately equal to but no greater than the length of the inside diameter of central tubular element 19.

Between each disk 21 and relative disk 24 is interposed an elastic thrust device 25 comprising an annular body 26, which extends axially outwards from relative disk 21, is integral with disk 21, and has a number of axial dead holes 27 (only one shown). Holes 27 extend parallel to axis 9 with their concavities facing relative disk 24, and are equally spaced about axis 9. Elastic device 25 also comprises a number of pins 27a, each of which is fitted in sliding manner inside a respective hole 27, and has an axial cavity 28 formed on a respective end engaged inside relative hole 27; and a number of springs 29, each of which is housed partly inside a relative cavity 28, and is compressed between relative pin 27a and the bottom end of a respective hole 27. The end of each pin 27a opposite the end engaged inside relative hole 27 extends through a through hole formed in relative disk 24, and is locked under pressure inside a relative tubular sleeve 30 extending parallel to axis 9 from disk 24 towards flange 18 and positioned facing a relative through hole 31 formed through flange 18 and having an inside diameter greater than the outside diameter of sleeve 30.

Each half-drum 13 comprises a central slide 32 fitted in sliding manner to shaft 10 and having an inner end portion—i.e. facing the other half-drum 13 (not shown)—defined by relative disk 21 and by relative annular body 26, and an outer end portion defined by an annular hydraulic cylinder 33, which extends about shaft 10, is fitted integrally with relative pin 14, and defines an annular chamber 34 coaxial with axis 9 and facing flange 18. Cylinder 33 and annular body 26 are connected integrally to each other by a cylindrical tubular liner 35 coaxial with shaft 10 and mating with shaft 10 via the interposition of slide pads.

Chamber 34 houses in sliding manner—in one direction by virtue of a pressurized fluid fed along a conduit 36, and in the opposite direction in response to a vacuum generated in chamber 34 along conduit 36—an annular piston 37, an axially inner portion of which—i.e. facing flange 18—projects axially from chamber 34 and has an annular appendix 38 projecting radially outwards from piston 37 and fitted on the free radial end with one end of a tubular body 39 extending coaxially with axis 9 outside cylinder 33. Appendix 38 is fitted laterally with a further tubular body 40 extending coaxially with axis 9 on the opposite side of appendix 38 to tubular body 39, and is fitted in sliding manner to the outer surface of annular body 26 to slide, with respect to annular body 26, to and from a withdrawn position (FIG. 4) in which a free end of tubular body 40 is arrested contacting relative disk 21.

Appendix 38 has a first radial through hole 41 communicating with the outside and for supplying a pressurized fluid, preferably compressed air; and a ring of cylindrical radial through holes 42 (only one shown) equally spaced about axis 9 and housing in sliding manner respective cylindrical pins 43, which are prevented by respective key devices 44 from rotating about their respective axes inside respective holes 42.

Together with liner 35, piston 37 defines an annular chamber 45 housing in sliding manner—in one direction by virtue of a pressurized fluid fed to chamber 45 along a conduit 45a, and in the opposite direction by a vacuum generated in chamber 45 along conduit 45a—a further annular piston 46 coaxial with axis 9 and defined externally by a truncated-cone-shaped cam surface 47 tapering towards flange 18 and cooperating with a number of tappet rollers 48, each of which is fitted in rotary manner to the radially inner end of a respective pin 43. The ring of pins 43 is connected to a ring of sectors 43a, each of which is substantially rectangular in a radial plane with respect to axis 9, and is defined by two blocks 49 and 50. Block 49 is connected integrally to relative pin 43 and is substantially triangular; and block 50 is also substantially triangular and complementary to corresponding block 49, and is housed, together with relative block 49 and the other sectors 43a, inside an annular, substantially rectangular-section chamber 51, which extends about axis 9 between the ring of pins 43 and disk 21, and is at least partly defined radially inwards by tubular body 40.

The two blocks 49 and 50 are of substantially the same radial thickness, are positioned contacting each other along respective inclined surfaces 52 and 53, and are connected to each other via the interposition of a key device 54 located in an axial plane of drum 1. More specifically, surface 52 of block 49 extends the full thickness of block 49, and slopes towards axis 9 and flange 18 to define, together with the other surfaces 52, a substantially truncated-cone-shaped cam surface coaxial with axis 9; whereas surface 53 is parallel to surface 52 and connected to a cylindrical outer surface 55 of block 50 by a shoulder 56 lying in a plane crosswise to axis 9. Block 49 is also defined outwards by a cylindrical surface 55a, which, in the rest condition shown in FIG. 1, is aligned with surface 55 of relative block 50. More specifically, surface 55 is much larger than surface 55a, and defines substantially the whole radially outer surface of relative sector 43a.

In said rest condition, surfaces 55 and 55a define, together with the outer surface of tubular body 39, a cylindrical surface 57 coaxial with axis 9 and for supporting a bladder 58 having two inner reinforcing rings or shoes 59 and 60, of which shoe 59 is housed in an annular groove formed on the radially outer surface of appendix 38, and shoe 60 is housed in an annular groove formed along surfaces 55. Bladder 58 also comprises an intermediate bellows 61 housed in an annular groove 62 defined between tubular body 39 and the ring of blocks 49; and a further inner reinforcing ring 63 contacting the radially outer ends of pins 43 and defining an annular portion 64 for supporting a relative bead 7.

Operation of drum 1 will now be described as of the rest configuration shown in FIG. 1, in which each half-drum 13 is at a maximum distance from flange 18; pistons 37 and 46 are at a maximum distance from flange 18; bladder 58 is deflated and lying flat on surface 57; and central body 17 is in the distended configuration with segments 20, 22 and 23 substantially outside one another and so positioned as to define a substantially cylindrical surface of substantially the same diameter as surface 57.

As shown in FIG. 1, body ply 4—obviously provided with an innerliner (not shown)—is placed on drum 1 in the rest configuration described above, and beads 7 and respective bead fillers 8 are assembled.

Figure 2:
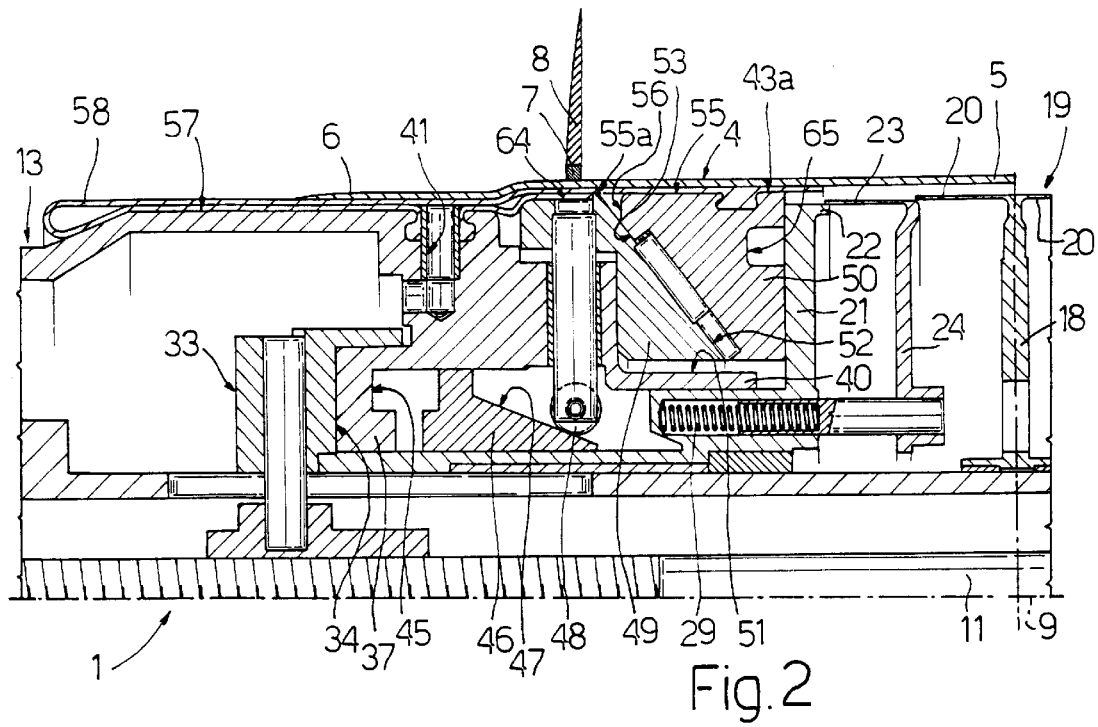
FIGS 2 to 5 show the FIG. 1 detail in four different operating positions.

More specifically, each bead 7 is positioned facing the relative supporting portion 64 surrounding the radially outer ends of relative pins 43, which, as shown in FIG. 2, are moved radially outwards to radially expand sectors 43a and clamp bead 7 in position on relative half-drum 13. For which purpose, compressed fluid, preferably air, is fed into chamber 45 along conduit 45a between pistons 37 and 46, so as to move piston 46 towards flange 18 and gradually wedge piston 46 beneath tappet rollers 48, which, as they roll up the ramps defined by relative surfaces 47, move pins 43 and relative sectors 43a radially so that sectors 43a clamp body ply 4 against the inner surface of relative bead 7 at relative supporting portion 64.

Since the constant length of chamber 51 in the direction of axis 9 prevents any relative movement between each block 49 and relative block 50, the radially outward movement of sectors 43a is accompanied by an equal radially outward movement of blocks 49 and 50.

Figure 3:
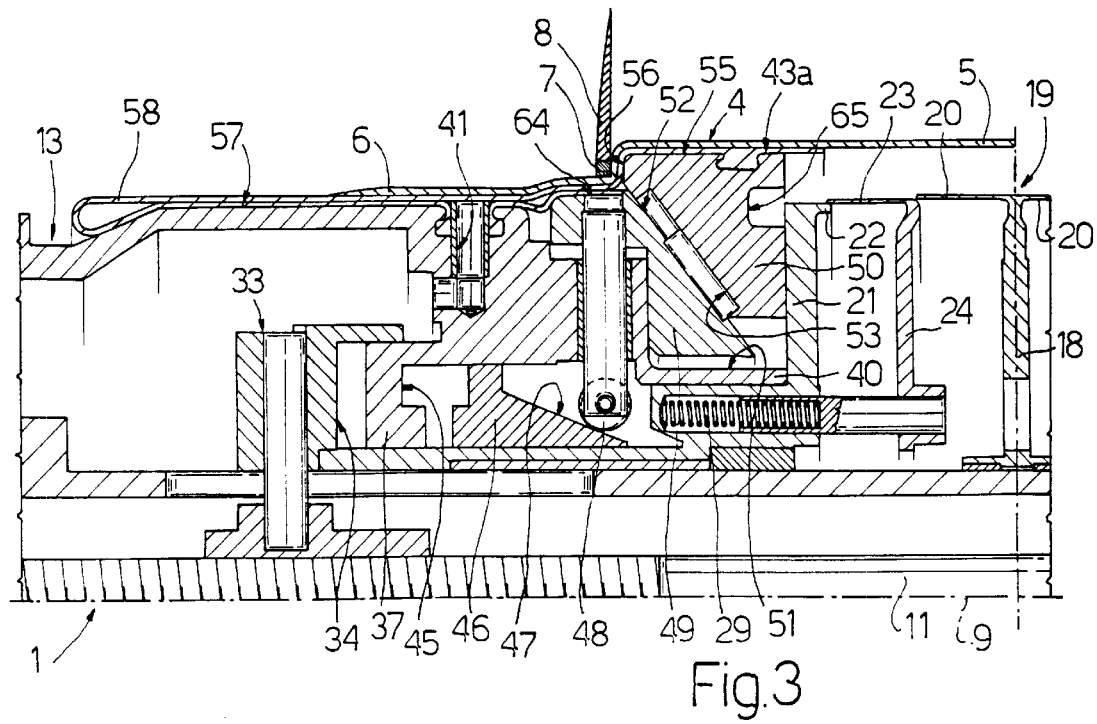

As shown in FIG. 3, pressurized fluid, preferably air, is then fed along conduit 36 of each half-drum 13 into relative chamber 34 to move relative piston 37 towards flange 18 until the free end of relative tubular body 40 contacts relative disk 21, thus reducing the length of relative chamber 51. As a consequence of the axial movement of piston 37, of said reduction in the length of chamber 51, and the fact that blocks 49 are axially integral with piston 37, each block 50 moves radially outwards with surface 53 contacting surface 52 of relative block 49, until the whole of shoulder 56 projects radially outwards with respect to surface 55a, in a position immediately adjacent to relative bead 7 and on the side of bead 7 facing flange 18, and until a lateral groove 65 of blocks 50 moves into a position facing the outer end of relative segment 23 of central body 17.

Figure 4:
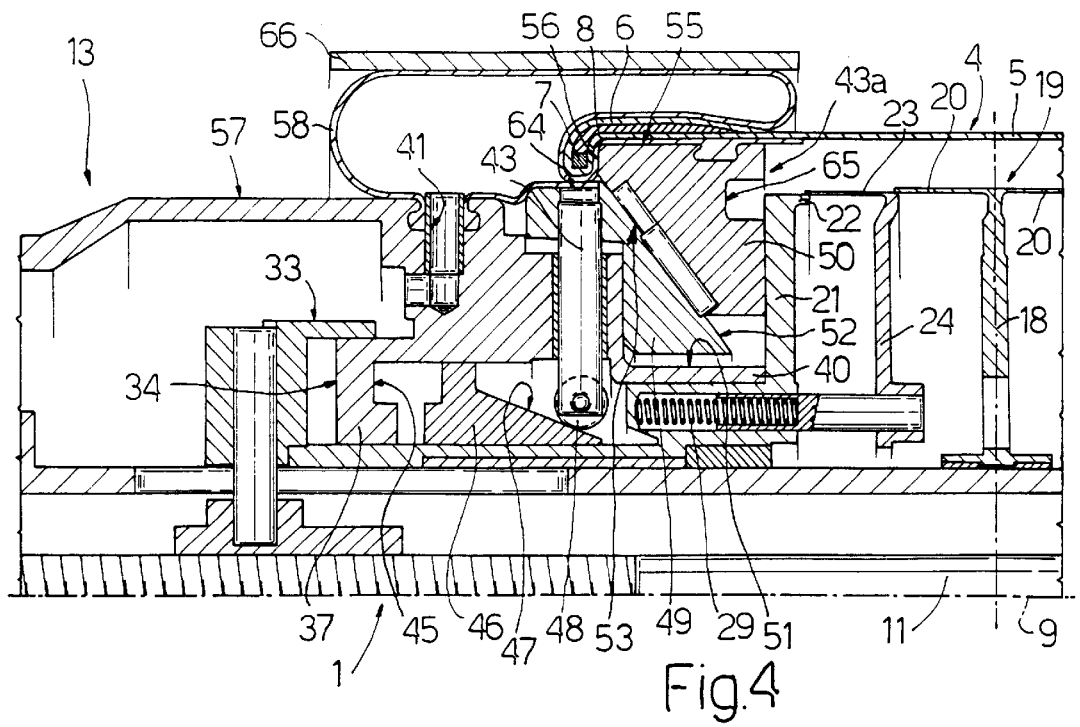

As shown in FIG. 4, simultaneously with the axial movement of piston 37 described above, compressed air is fed through holes 41 into bladders 58, each of which, once inflated to partly turn up relative lateral portion 6 of body ply 4, is engaged by an outer cylindrical body 66, which is moved, parallel to axis 9, towards flange 18 to deform bladder 58 and complete turn-up of relative lateral portion 6 onto the outer surface of central portion 5 of body ply 4.

In addition to turning up relative lateral portion 6, each bladder 58 also compresses against relative shoulder 56 the portion of body ply 4 surrounding relative bead 7, so as to perfectly compact this highly critical portion of carcass 3, while at the same time maintaining relative bead 7 in a perfectly radial position on relative shoulder 56.

Once the bladders are restored to the original rest position (FIG. 5), screw 11 may be activated to move half-drums 13 towards each other; which approach movement collapses central body 17 in opposition to springs 29, thus forming carcass 3.

In connection with the above, it should be pointed out that the annular supporting surface defined by shoulders 56 when relative blocks are in the outer position is a highly stable annular surface capable of withstanding relatively high axial pressures, due to blocks 50 being maintained in the expanded position, not by hinges or similar yielding devices, but by a positive support defined by disks 21. Drum 1 described therefore permits the use of high-pressure bladders 58, i.e. capable of applying extremely high compacting pressures to the bead portions of carcass 3 being formed. Moreover, on drum 1, on account of the shape of blocks 50, each lateral portion 6 of body ply 4 is turned up onto a substantially continuous, substantially cylindrical surface defined by surfaces 55 of relative blocks 50, and which therefore enables strips of additional material, such as a sidewall, to be applied and stitched easily and effectively onto the turned-up lateral portion 6.

What is claimed is:

1. A unistage drum for building tires (2) comprising a carcass (3) having two beads (7); the drum (1) comprising a cylindrical central body (17), and two half-drums (13) located on opposite sides of the central body (17) and moved in opposite directions along a common axis (9) by central actuating means (11); each half-drum (13) comprising a ring of sectors (43a), and first actuating means for moving said sectors (43a) in a substantially radial direction with respect to said axis (9) and to and from an expanded position to clamp a respective bead (7) in a relative given axial position (64) along the relative half-drum (13); wherein each said sector (43a) comprises a first and a second block (49,50), of which said first block (49) cooperates with a relative said bead (7) in said expanded position, and said second block (50) comprises a cylindrical outer surface (55); and second actuating means (33,37) for moving each said second block (50), with respect to the relative fit block (49), to and from an outer position in which each second block (50) projects radially outwards with respect to the relative first block (49) to define a relative portion of an annular shoulder (56) located between the given said axial position (64) and the relative said outer surface (55), and in a position adjacent to the relative given said axial position (64), wherein each said first block (49) is defied, towards the relative second block (50), by a first inclined surface (52) defining, with the first inclined surfaces (52) of die other first blocks (49) of said sectors (43a) in said ring, a substantially truncated-cone-shaped surface coaxial with said axis (9) and to which die second blocks (50) of the sectors (43a) in said ring are mounded to slide to and from said expanded position.

2. The unistage drum as claimed in claim 1, being characterized in that each said sector (43a) is substantially rectangular in a radial plane with respect to said axis (9); said two blocks (49,50) being substantially triangular and complementary in shape, and respectively having a first (52) and a second inclined surface (53) contacting and mating in sliding manner with each other.

3. The unistage drum of claim 2, wherein said second actuating means (33, 37) are actuating means acting along said axis (9) to move each said first block (49) axially along the relative half-drum (13); axial retaining means (21) being provided to axially retain each said second block (50) with respect: to the relative half-drum.

4. The unistage drum of claim 1, wherein an axial retaining means (21) is provided to axially retain each said second block (50); wherein moving elements of said first and second actuating means are movable towards said axial retaining means (21) by virtue of a pressurized fluid.

5. A unistage drum as claimed in claim 4, characterized in that said central body (17) is a telescopic tubular body defined by a number of tubular elements (19, 22, 23) connected so as to slide inside one another and wherein said number of tubular elements (20, 22, 23) comprises two opposite end tubular elements (22), each of which is located adjacent to a relative said half-drum (13) and is integral with said axial retaining means (21) of the relative half-drum (13).

6. The unistage drum of claim 1, wherein each said half-drum (13) comprises, at rest, a substantially cylindrical outer surface (57), and also comprises a high-pressure bladder (58) having a first inner reinforcing ring (63) located at the given said axial position (64) radially outwards of said first blocks (49), and a second inner reinforcing ring (60) surrounding said second blocks (50).

* * * * *